3,219,547
FRACTIONAL DISTILLATION PROCESS FOR PURIFYING TRIARYL PHOSPHATES

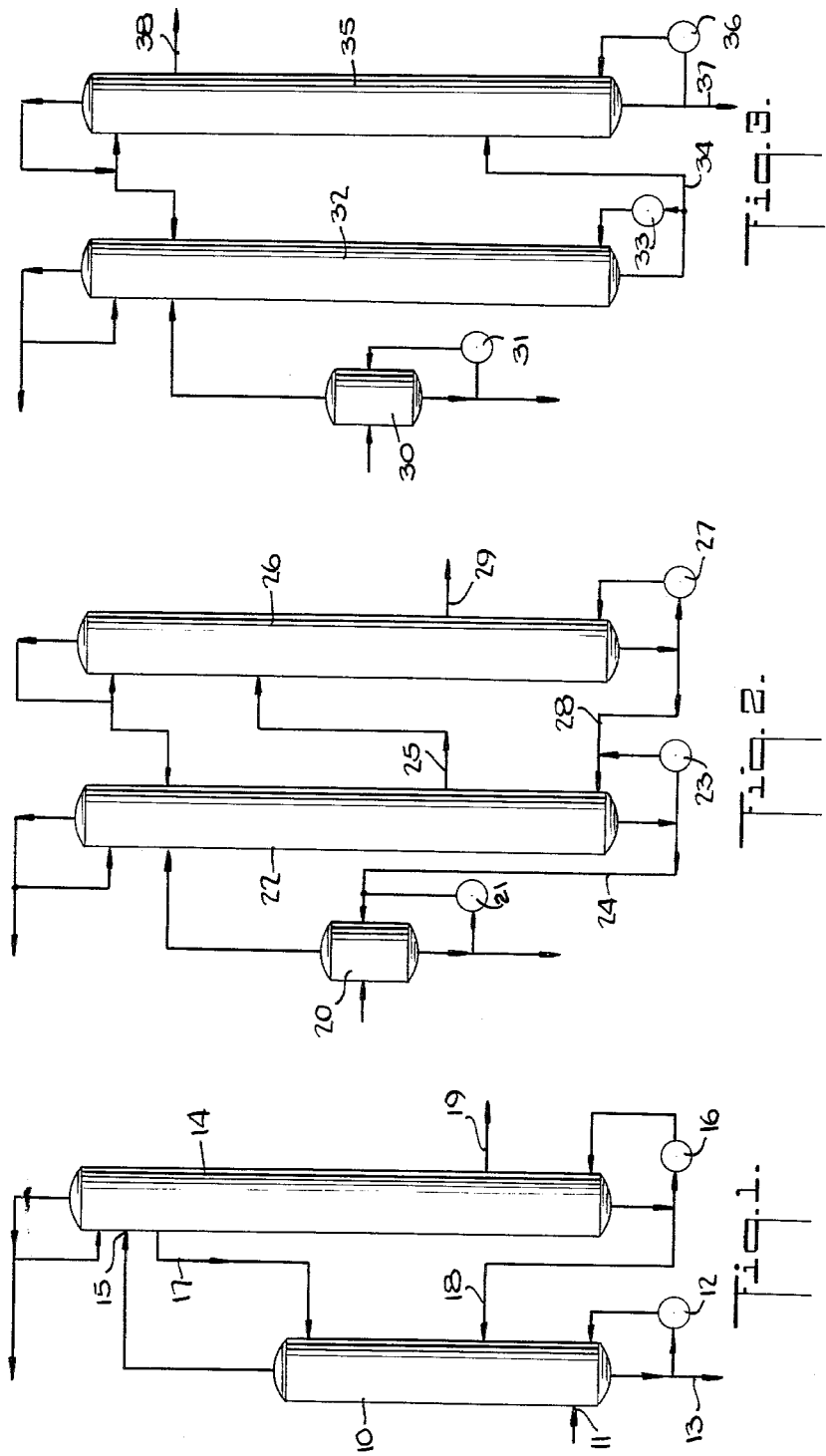

Edward N. Wheeler, Corpus Christi, Tex., assignor to Celanese Corporation of America, New York, N.Y., a corporation of Delaware
Continuation of application Ser. No. 107,873, Feb. 27, 1961. This application Mar. 13, 1963, Ser. No. 268,853
2 Claims. (Cl. 202—40)

This application is a continuation of application Serial No. 107,873 filed February 27, 1961, now abandoned.

This invention relates to the purification of crude triaryl phosphates. More particularly, it relates to the removal of impurities from crude triaryl phosphates.

Crude triaryl phosphates such as tricresyl phosphates contain a number of impurities which affect the quality of the phosphates. Several methods have been devised for purifying crude triaryl phosphates including the removal of the impurities by oxidation with potassium permanganate or by washing with caustic solutions. Many of these methods produce a highly purified product.

For many years, however, those skilled in the art have been seeking, without any substantial success, a method of purifying triaryl phosphates solely by distillation. Distillation methods were believed to be more desirable purification methods in that they would be less expensive, e.g., by eliminating the cost of oxidizing agent and other compositions used in purification and by reducing triaryl phosphates losses during purification e.g. losses in washing.

Of the many distillation processes developed, not one has successfully employed distillation alone to remove the impurities. In each of these processes, it was found to be necessary to employ additional steps to remove impurities which the distillation failed to completely remove.

Among the distillation processes used was one in which low boiling impurities (impurities having a lower boiling point than the triaryl phosphate) were first distilled off, followed by the removal of the heart cut which contained the triaryl phosphate, thus leaving a residue containing high boiling impurities (impurities having a boiling pont higher than that of the triaryl phosphate).

The low and high boiling impurities, the removal of which this invention is concerned with, include as low boiling impurities isomers of phenol, present in the phenols from which the triaryl phosphates may be produced, thiophenol impurities usually also present in said phenols; where the triaryl phosphate has been prepared by the well known reaction of a chloride of an oxyacid of phosphorus and a phenol, then the lower boiling impurities further include monoaryl phosphorodichloridates diaryl phosphorodichloridates and a group of unidentified colored compounds which are believed to be oxidation products of the phenols.

The high boiling impurities include the catalyst, diaryl hydrogen phosphate, tetraaryl pyrophosphate and a group of unidentified colored compounds which are higher boiling than tricresyl phosphate.

The heart cut then had to be washed with aqueous caustic solution to remove impurities which were not removed during distillation. In another process, a heart cut similar to that described above had to be treated with activated charcoal or other adsorbents to remove remaining impurities. In both the washing and the adsorbing steps, significant losses of triaryl phosphate occurred.

It is an object of this invention to provide an improved procedure for the purification of triaryl phosphate.

It is another object of this invention to provide a process for the purification of triaryl phosphate by distillation alone.

It is a further object of this invention to provide a continuous process for the purification of triaryl phosphates.

Other objects will be apparent from the following detailed description and claims in which all proportions are by weight unless otherwise stated.

I have now found that the aforementioned prior distillation procedures apparently failed to recognize the effects of auxiliary reactions inherent in these distillations, which reactions made it substantially impossible to achieve a high degree of purity in the distillation products. I have discovered that under the temperature conditions at which the heart cuts containing the triaryl phosphates were distilled off, the temperatures at the base of the distillation apparatus where the high boiling impurities tended to concentrate were sufficiently high to decompose such high boiling impurities to produce low boiling impurities which distilled off with and contaminated the heart cut. I have noted that high boiling impurities particularly tended to be deposited on the heating surfaces usually found in the base of distillation apparatus or in reboilers associated with the bases of fractional distillation apparatus which heating surfaces had temperatures higher than the temperature of the reactants in the bases. Such deposits of high boiling impurities displayed even more marked decomposition. Further, in the described batch distillations of the prior art, the decomposition of high boiling impurities became more pronounced with the increasing concentration of the high boiling impurities as the reaction proceeded toward completion. Thus, after the distillation of the heart cut had proceeded to a substantial extent, the heart cut removed contained substantial amounts of undesirable low boiling decomposition products of high boiling impurities.

In accordance with one aspect of my invention I have found that substantially complete purification of triaryl phosphates may be achieved by a novel continuous distillation in which low and preferably minimal concentrations of high boiling impurities are maintained. In this continuous distillation, a buildup of high boiling impurities such as that of the batch distillations of the prior art is avoided since fresh reactants are being continuously fed to the distillation zone and high boiling impurities are being continuously removed from the distillation zone as a base stream.

In accordance with a further aspect of my invention, crude triaryl phosphate is continuously fed to a distillation zone from which a residue stream comprising high boiling impurities is continuously removed and triaryl phosphate is continuously taken overhead as a vapor which also contains low boiling impurities. It is preferable that the overhead vapor be substantially free of high boiling impurities.

In other words, the temperatures under which the distillation is conducted should be below that at which heavy ends will distill off overhead. Whether heavy ends are distilling over may be determined by removing a small sample of the overhead vapors and batch distilling from said sample all low boiling impurities. The residue comprising triaryl phosphate should have an acidity of less than 0.2 mg. KOH and preferably less than 0.1 mg. KOH per gram of sample unless undesirable amounts of high boiling impurities are also contained. Sample residues having an acidity of less than 0.2 mg. KOH per gram would indicate an overhead vapor having less than 0.1 wt. percent of diaryl hydrogen phosphate. If the residue of the test sample has an acidity greater than 0.4 mg. KOH per gram, the distillation process overhead temperatures should be lowered to a point where the tested sample yields residue having an acidity within the above limits. In embodiments, hereinafter described, in which part of the overhead vapors are returned to the distillation zone as reflux, the overhead temperature may be conveniently lowered by increasing the reflux.

After the high boiling impurities are removed, the low boiling impurities may be removed from the triaryl phosphate by distillation. These low boiling impurities which are removed also contain low boiling decomposition products of high boiling impurities which may have decomposed during the initial distillation for the separation of high boiling impurities.

While it is preferred that substantially all of the high boiling impurities be removed prior to a final distillation in which low boiling impurities are separated from the triaryl phosphate, it is to be understood that the process of this invention will still be effective where a major portion of high boiling impurities are separated in the initial distillation. In such process, the final distillation is conducted in a fractional distillation column to which the triaryl phosphate containing low boiling impurities and the remaining high boiling impurities are continuously fed. The low boiling impurities are continuously removed overhead, any remaining high boiling impurties are continuously removed as a residue base stream and triaryl phosphate is continuously removed as a sidestream from said column at a point having a temperature above the condensation point of said low boiling impurities and below the vaporization point of high boiling impurities.

It is preferable that the final distillation be conducted at subatmospheric pressures. This is particularly true when the triaryl phosphates fed to the final zone contain some high boiling impurities. Subatmospheric pressures permit the distillation to be carried out at lower temperatures, thereby maintaining decomposition of high boiling impurities at a minimum.

In another aspect of this invention, the crude triaryl phosphate is continuously passed through a plurality of initial fractional distillation zones to separate a major portion of high boiling impurities and to separate low boiling impurities from said triaryl phosphate. Then the triaryl phosphate is fed to a final distillation zone from which low boiling impurities are removed overhead (from said final zone,) any remaining high boiling impurities are removed in a base stream and triaryl phosphate is removed as a sidestream at a point having a temperature as hereinabove disclosed.

According to another aspect of this invention the crude triaryl phosphate is advantageously subjected to a plurality of initial distillations including an initial distillation in which a major portion of the high boiling impurities are separated as heavy ends and an initial distillation in which a major portion of the low boiling impurities are separated as light ends. The initial distillation in which the low boiling impurities are separated is preferably a fractional distillation while the initial distillation in which the high boiling impurities are separated may be either by fractional distillation or flash distillation which is distillation without any reflux. The final distillation is preferably a fractional distillation.

The instant invention has its greatest utility in the purification of tri(methyl substituted phenyl) phosphates such as tertiary phosphates of cresol or xylenol or the cresol or cresol-xylenol mixtures known as cresylic acid. However, it is also suitable for purification of tertiary phosphates of other hydroxy aryl compounds. Specific instances of hydroxy aryl compounds are phenol; ortho-, meta-, and para-cresol; any of the six xylenols; any of the six trimethyl phenols; any of the three tetra-methyl phenols; penta-methyl phenol; substituted phenols such as the ethyl, isopropyl, n-propyl, n-butyl, sec.-butyl, tert.-butyl, amyl, etc., which correspond to the series of methyl substituted phenols set forth above; phenols substituted with halogen, nitro- and similar groups; etc. The triaryl phosphates may be produced in conventional manner, as by reaction of an excess of the hydroxyaryl compound with phosphorus oxychloride in the presence of a catalyst for the reaction, e.g., magnesium chloride, stannic chloride, titanium tetrachloride and titanium esters. The process of this invention may also be used to purify tricresyl phosphate prepared according to U.S. Patent No. 2,805,240 to W. Prahl. Further, this process may be employed to purify and reclaim used triaryl phosphate products.

The temperature, pressures, and residence times in the initial and final distillation zones will vary with the triaryl phosphate to be purified. In general, when the initial distillation is fractional distillation, the base pressure ranges preferably from about 15 mm. to 50 mm. Hg A and most preferably from about 20 mm. to 30 mm., the overhead pressure ranges preferably from about 5 mm. to 35 mm. HgA and most preferably from 5 mm. to 10 mm. The temperature at which the initial distillation is conducted is below the temperature at which high boilers distill overhead. This temperature varies with the composition of the crude mixture. As heretofore set forth samples of the overhead vapors may be tested for high boiler content and the temperature adjusted accordingly. For example in purifying tertiary phosphates of xylenol, it has been found that the overhead temperature of the initial zone is preferably in the range of from about 260 to 285° and the base temperature in the range of from about 300–320° C. When phosphates of phenol are being purified, the temperatures are preferably from 30 to 40° C. lower and when tricresyl phosphate is being purified the temperatures are from 15 to 20° C. lower than those given for xylenol phosphates.

The rates of feed, removal of the overhead vapors and withdrawal of the residue are such that the residence time of the triaryl phosphate and the low boilers preferably range from about 6 to 30 minutes while the residue may have a residence time of over 1 hour and up to 7 hours or higher. At least part of this initial distillation may be conducted as a flash distillation that is a distillation without rectification under the same conditions.

The final distillation is preferably conducted under the following conditions:

Base pressures from about 15 mm. to 50 mm. HgA and most advantageously from about 20 mm. to 30 mm. Overhead pressure from about 5 to 35 mm. and most advantageously from about 5 to 10 mm. The tempeature of the final distillation will vary with the nature of the crude triaryl phasphate. For example, when triaryl phophates prepared from xylenol are used, the overhead temperature of the final distillation is preferably from 150 to 230° C. and the base temperature is preferably from 300 to 320° C. When phosphates of phenol are being purified, the temperatures are preferably from 30 to 40° C. lower and when tricresyl phosphate is being purified, the temperatures are from 15 to 20° C. lower than those given for xylenol phosphates.

The residence times in the final distillation of the feed thereto is from about 6 to 30 minutes while the residue remaining of said zone may remain for over one hour and up to seven hours or more.

Where the initial distillation and the final distillation are combined in a continuous distillation, it has been found to be advantageous to feed the initial distillation zone, a reflux removed from said final distillation zone preferably the upper part of said final distillation zone.

The invention is illustrated further in the accompanying drawing in which FIG. 1 is a diagrammatic view of a preferred embodiment of this invention. FIG. 2 is a diagrammatic view of another embodiment of this invention. FIG. 3 is a diagrammatic view of still another embodiment of this invention.

As shown in FIG. 1, the liquid crude triaryl phosphate is continuously fed to initial fractional distillation column 10 at point 11. Column 10 is equipped with reboiler 12. Residue stream 13 containing high boiling impurities is continuously removed from column 10. Low boiling impurities and the bulk of the triaryl phosphate are continuously removed overhead from column 10 and continuously fed to final column 14 at point 15 which is preferably the tray below the top tray of the column. Column 14 is also equipped with a reboiler 16. Light ends are continuously removed overhead from column 14. A liquid sidestream 17 is continously withdrawn from column 14 and returned to column 10 as reflux. A residue stream 18 is continously withdrawn from column 14 and returned to column 10. Purified triaryl phosphate is withdrawn from final column 14 as vapor sidestream 19.

FIGURES 2 and 3 disclose continuous processes in which a major portion of both low boiling impurities and high boiling impurities are eliminated before the final distillation zone.

With reference to FIGURE 2, the crude triaryl phosphate is continuously withdrawn from flash distiller 20 and fed to fractional distillation column 22 equipped with reboiler 23. Light ends containing low boiling impurities are continuously removed overhead from column 22. Residue stream 24 is continuously removed from the base of column 22 and recycled to flash distiller 20. Vapor sidestream 25 which contains the triaryl phosphate, is continuously removed from column 22 and fed to final distillation column 26 equipped with reboiler 27. Light ends are continuously removed overhead from column 26. Part of these light ends are returned to column 22 as reflux and part are returned to column 26 as reflux. A residue stream 28 is continuously withdrawn from the base of column 26 and recycled to column 22. The purified triaryl phosphate is withdrawn from column 26 as vapor sidestream 29.

With reference to FIG. 3, the crude triaryl phosphate is continuously fed to flash distiller 30 equipped with reboiler 31. The residue containing heavy ends is continuously removed from distiller 30. The light ends are continuously withdrawn from distiller 30 and fed to fractional distillation column 32 equipped with reboiler 33. Light ends containing low boiling impurities are continuously removed overhead from column 32. Residue stream 34 is continuously removed from the base of column 32 and fed to final distillation column 35 equipped with reboiler 36. Light ends are continuously removed overhead from column 35 and returned to column 32 as reflux. A residue stream 37 is continuously withdrawn from the base of column 35. The purified triaryl phosphate is withdrawn from column 35 as liquid sidestream 38, which is sufficiently high on the column to be above the point to which substantially no high boiling impurities may rise and sufficiently low enough on the column to be at a temperature high enough to prevent the condensation of significant amounts of the low boiling impurities and low boiling decomposition products of high boiling impurities so that low boilers and high boilers are substantially absent from the liquid sidestream in other than negligible amounts.

The following example is given to illustrate this invention further:

*Example*

Crude liquid tricresyl phosphate made by the reaction of cresylic acid and phosphorus oxychloride in the presence of 0.2 wt. percent cresyl titanate having an APHA color of over 300, a permanganate demand of greater than 10 g. of $KMnO_4$ per hundred g. of sample and an acidity of 5 mg. KOH per g. was continuously fed at the rate of 600 parts per hour to the 2nd tray of an 8-tray initial distillation column 10 of an apparatus set-up as shown in FIGURE 1. The column 10 was operated at a base pressure of 28 mm. HgA, an overhead pressure of 19 mm. HgA, a base temperature of 308° C. and an overhead temperature of 270° C. Overhead vapors were continuously removed from the column at the rate of 600 parts per hour and a residue stream was continuously removed from the base at the rate of 42 parts per hour. An additional 600 to 800 parts per hour of the overhead vapors were condensed and returned to column 10 as reflux. The crude tricresyl phosphate had an average residence time of 20 minutes in the column and reboiler while the residue stream had a total average residence time of 290 minutes (4.8 hours) primarily in the reboiler. The overhead vapors from column 10 were continuously fed to the 8th tray of a 10-tray distillation column 14. A 50-g. sample of the overhead vapors was condensed and then distilled at a pressure of 10 mm. HgA to an overhead temperature of 275° C. over a period of 50 minutes. About 20 g. of the sample was distilled overhead. A 20-g. sample of residue had an acidity of 0.2 mg. KOH per g. It was titrated to the phenolpthalein end point with 0.1 N caustic after refluxing the sample for three minutes in an isopropyl alcohol solution containing 10 wt. percent water. Column 14 was operated at a base pressure of 28 mm. HgA, an overhead pressure of 17 mm. HgA, a base temperature of 308° C., an overhead temperature of 210° C. and a reflux ration of 1 to 1. A residue base stream of 42 parts per hour was continuously removed from column 14 and fed to the second tray of column 10. An overhead light ends stream was removed at a rate of 66 parts per hour. A vapor sidestream comprising the purified tricresyl phosphate was removed from the 2nd tray of column 14 at the rate of 490 parts per hour and condensed. The resulting tricresyl phosphate had an APHA color of 20, an acidity of 0.03 mg. KOH per g. and an excellent permanganate time of more than several hours (half-hour minimum is required).

It is to be understood that the foregoing detailed description is given merely by way of illustration and that many variations may be made therein without departing from the spirit of my invention.

Having described my invention what I desire to secure by Letters Patent is:

1. Process for purifying crude triaryl phosphate containing low-boiling and high-boiling impurities which comprises feeding said crude to an initial fractional distillation column; continuously removing a residue stream containing substantially all of the high boiling impurities in said crude; continuously removing as a vapor substantially all of the triaryl phosphate together with the low boiling impurities in said crude; feeding said vapor to a final fractional distillation column, operating at subatmospheric pressure, near the top of said final column; recycling the base stream of said final column to said initial column; refluxing a liquid stream, taken from said final column near the top thereof to said initial column near the top thereof; continuously removing low boilers overhead from said final column; and continuously removing the triaryl phosphate product as a vapor sidestream from said final column at a point below said reflux stream but above said recycle base stream.

2. Process for purifying crude triaryl phosphate containing low-boiling and high-boiling impurities which comprises feeding said crude to an initial fractional distillation column near the base of said initial column; continuously removing a residue stream containing substantially all of the high boiling impurities in said crude; continuously removing overhead substantially all of the triaryl phosphate together with the low boiling impurities in said crude; feeding said overhead to a final fractional distillation column, operating at subatmospheric pressure, near the top of said final column; recycling the base stream of said final column to said initial column at a point above the point of crude feed; refluxing a liquid sidestream, taken from said final column near the top thereof but below the feed thereto, to said initial column near the top thereof; continuously removing low boilers overhead from said final column; and continuously removing the triaryl phosphate product as a vapor sidestream from said final column at a point below said liquid reflux sidestream but above said recycle base stream.

References Cited by the Examiner

UNITED STATES PATENTS

| | | | |
|---|---|---|---|
| 2,647,078 | 7/1953 | Chambers | 202—40 X |
| 2,672,434 | 3/1954 | MacLarland | 202—40 |
| 2,672,435 | 3/1954 | Shoptaw | 202—40 |
| 2,805,240 | 9/1957 | Prahl | 260—461.311 |
| 2,813,134 | 11/1957 | Johnson | 202—40 X |
| 2,870,192 | 1/1959 | Bonstedt | 260—461.311 |

NORMAN YUDKOFF, *Primary Examiner.*

GEORGE D. MITCHELL, *Examiner.*